E. CROUSE.

GASOLINE DISPENSING DEVICE.

APPLICATION FILED FEB. 8, 1921.

Reissued Aug. 22, 1922.

15,432.

2 SHEETS—SHEET 1.

Inventor

EMORY CROUSE.

By

Attorney

E. CROUSE.

GASOLINE DISPENSING DEVICE.

APPLICATION FILED FEB. 8, 1921.

Reissued Aug. 22, 1922. 15,432.

2 SHEETS—SHEET 2.

Inventor

EMORY CROUSE.

By

Attorney

UNITED STATES PATENT OFFICE.

EMORY CROUSE, OF WICHITA, KANSAS, ASSIGNOR TO THE CLEAR VISION PUMP COMPANY, A CORPORATION OF KANSAS.

GASOLINE-DISPENSING DEVICE.

15,432. Specification of Reissued Letters Patent. Reissued Aug. 22, 1922.

Original No. 1,304,028, dated May 20, 1919, Serial No. 247,264, filed July 29, 1918. Application for reissue filed February 8, 1921. Serial No. 443,451.

*To all whom it may concern:*

Be it known that I, EMORY CROUSE, a citizen of the United States, residing at Wichita, in the county of Sedgwick and State of Kansas, have invented certain new and useful Improvements in Gasoline-Dispensing Devices; and I do declare the following to be a full, clear, and exact description of the invention, such as will enable others skilled in the art to which it pertains to make and use the same, reference being had to the accompanying drawings, and to the characters of reference marked thereon, which form a part of this specification.

This invention relates to liquid-dispensing devices, particularly to those of the type adapted for dispensing gasoline, and has for its object the provision of a device embodying a transparent receptacle, graduated throughout its length, into which the gasoline is first pumped and then subsequently withdrawn, the quantity drawn off being easily seen by the purchaser upon observing the difference in the levels of the liquid within the transparent receptacle, this arrangement preventing fradulent measurement by the dealer.

An important object is the provision of a device of this character provided with means whereby the initial quantity of liquid within the transparent receptacle will always be the same and be automatically regulated, any excessive amount pumped thereinto automatically returning to the storage tank with which the device is associated.

A further object is the provision of a device of this character provided with means whereby all the gasoline may be drained back into the storage tank and whereby the various portions may be drained separately in order that sediment may be removed.

Another object is the provision of a device of this character, the mechanism of which is inclosed whereby tampering therewith will be prevented and whereby the mechanism will be protected from injury.

Figure 1:
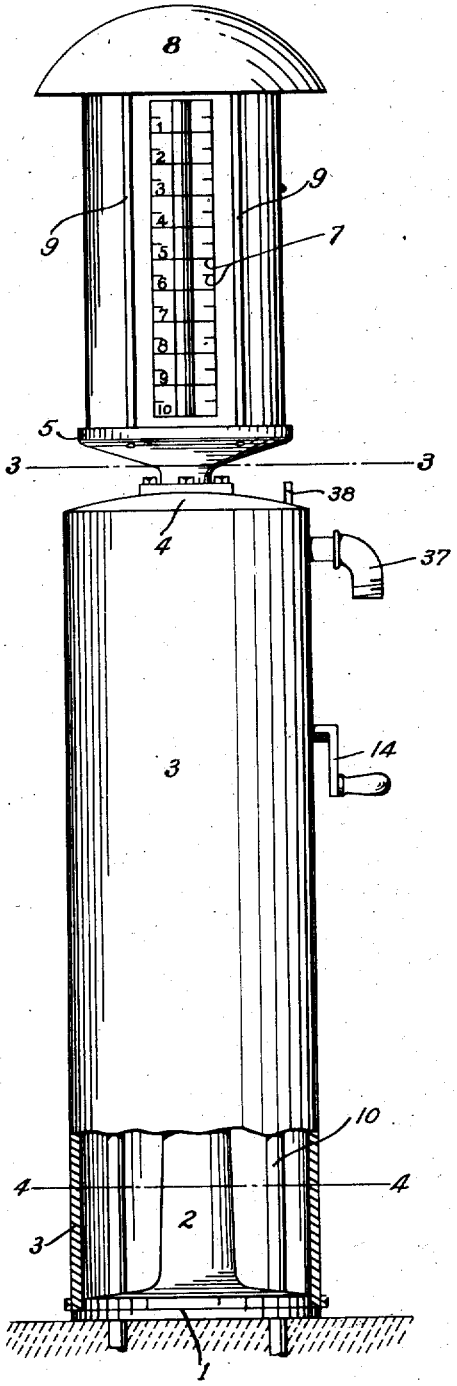
Figure 3:
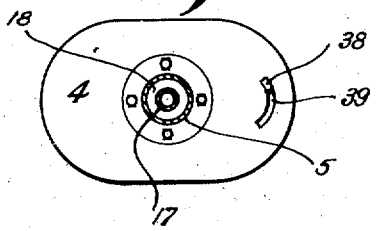
Figure 4:
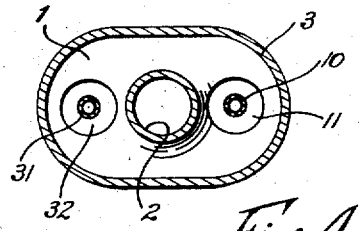
Figure 5:
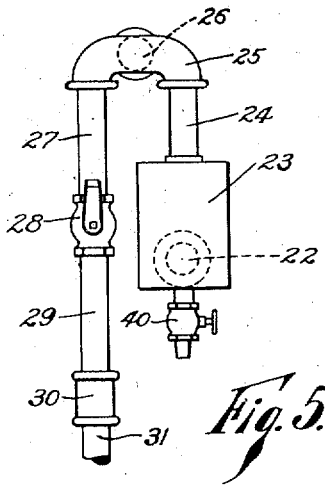
Figure 2:
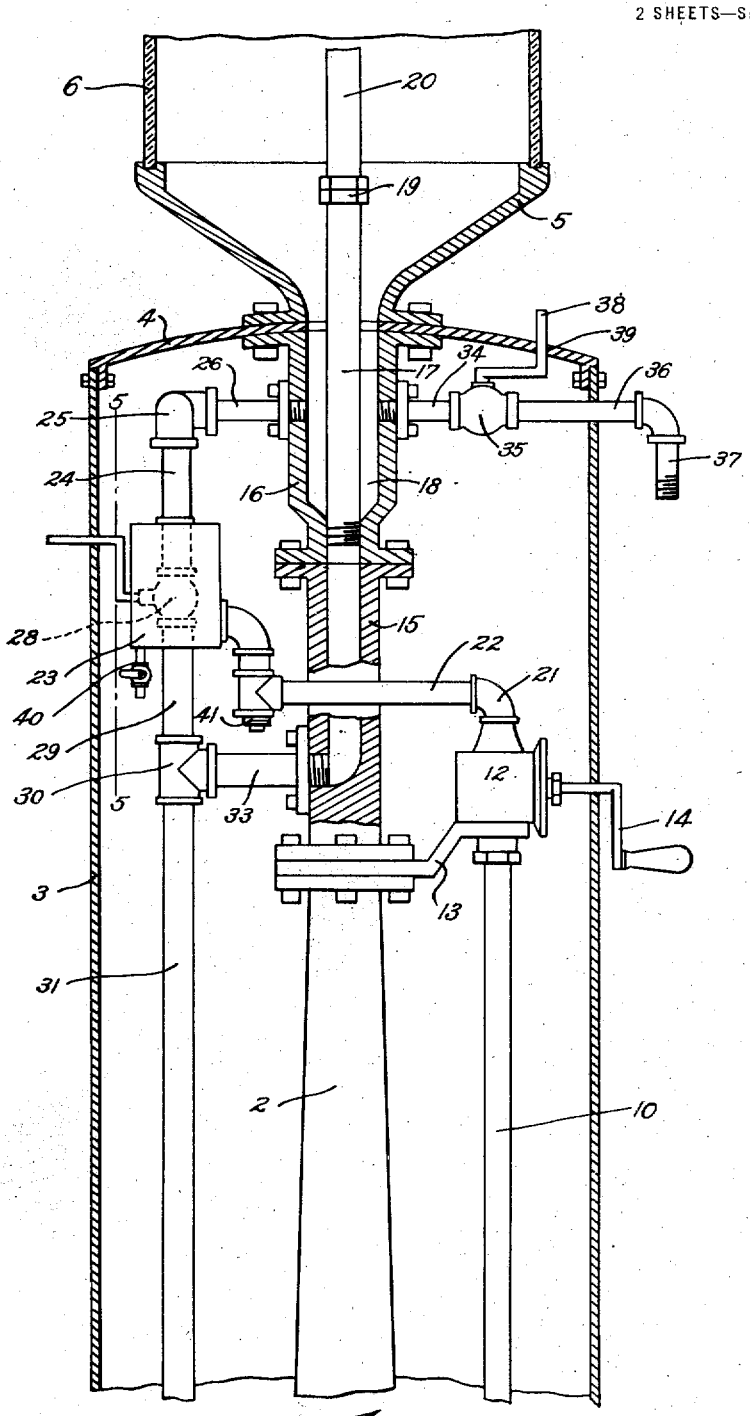

With these and other objects and advantages in view, such as simplicity, cheapness in manufacture, efficiency in service, durability in use, and the general improvement of the art, the invention consists in the details of construction to be hereinafter more fully described and claimed, and illustrated in the accompanying drawings, in which:

Figure 1 is an elevation of the complete device, portions being broken away and in section, Fig. 2 is a longitudinal sectional view through the main portion of the device, Fig. 3 is a cross sectional view on the line 3—3 of Fig. 1, Fig. 4 is a cross sectional view on the line 4—4 of Fig. 1, and Fig. 5 is a detail elevational view on the line 5—5 of Fig. 2.

Referring more particularly to the drawings, the numeral 1 designates the base of my device from which rises the standard 2 which is hollow, if desired. A shell 3 is disposed about the standard and is secured to the edge of the base 1, conforming to the curvature thereof. A plate 4 is secured at the upper edge of and forms a closure for the top of the shell 3. The plate 4 is provided with a central opening communicating with the interior of an upwardly flaring casting 5 upon the upper edge of which rests a cylindrical member 6 of glass provided with graduations 7, indicating gallons and halves. A cap 8 is disposed upon the top edge of the glass cylinder 6 and forms a closure therefor. The cap 8, cylinder 6 and casting 5 are held in clamped relation by means of suitable stay rods 9, and it is of course understood that any suitable gaskets are provided between the edges of the cylinder 6 and the cap 8 and the cylinder and casting 5.

A pipe 10 leads from the storage tank (not shown) through a hole 11 in the base 1 and extends upwardly within the shell 3 and is connected at its upper end with a pump 12 mounted on a bracket 13 secured to the standard 2. The pump 12 has an operating handle 14 extending through the shell 3. This pump is not shown in detail as it may be of any ordinary construction of rotary pump, though a reciprocatory pump might also be employed. A hollow member 15 is disposed upon the top of the standard 2 and has in turn secured upon its upper end a hollow casting 16 which has a bore equal to the diameter of the opening in the plate 4 and lower end of the member 5 and which is secured to the underside of the plate 4. A pipe 17 is threaded into the lower portion of the member 16 and communicates with the interior of the member 15, as shown. This pipe is of considerably less diameter than the bore of the member 16 so as to provide an annular chamber 18 surrounding the pipe. Secured upon the upper end of the pipe 17 by a suitable or conventional connection 19 is another pipe 20 which extends upwardly into the glass cylinder 6 and terminates at the upper line of graduations.

A suitable coupling 21 is connected to the pump 12 and has connected therewith a pipe 22 which is in turn connected with a filter 23 from which extends a pipe 24 leading to one entrance of a coupling 25 which is connected with a pipe 26 leading into one side of the chamber 18. A second pipe 27 is also connected with the coupling 25 and is connected with a valve 28 from which leads a pipe 29 connected with a T 30. A pipe 31 is connected with the T 30 and leads downwardly within the shell 3 and passes through a hole 32 in the base 1 and into the storage tank. Another pipe 33 also leads from the T 30 and communicates with the interior of the hollow member 15.

A pipe 34 communicates with the chamber 18 opposite the pipe 26 and is connected with a valve 35 from which extends an outlet pipe 36 extending through the shell 3 and terminating in a discharge nozzle 37 with which may be connected a hose, if desired. The valve 35 is provided with a handle 38 extending through an arcuate slot 39 in the plate 4 which permits opening and closing the valve from the exterior of the shell.

For draining purposes the filter 23 is provided with a drain cock 40, and the pipe 22 has interposed therein a drain coupling closed by a plug 41.

In the operation of the device, the valve 35 being closed, the operator turns the handle 14 to operate the pump 12, which action draws the gasoline from the storage tank, through the pipe 10 and forces it through the pipe 22, filter 23, pipe 24, coupling 25, pipe 26, into the chamber 18 and thence into the cylinder 6. When glass cylinder is full, the operator ceases pumping and any surplus gasoline within the glass container above the highest graduation or above the end of the pipe 20 will flow into the pipe 20, through the coupling 19, pipe 17, into the member 15 and thence through the pipe 33, coupling 30 and pipe 31 back to the storage tank. The operator then opens the valve 35, by means of the handle 38, whereupon gasoline will flow from the glass receptacle into the chamber 18 and out through the discharge nozzle 37. By means of the graduations 7, which progress downwardly, the operator can tell at a glance how many gallons have been drawn off. When the device is to stand idle and it is desired to drain it entirely, it is merely necessary to open the valve 28 whereupon all the liquid within the glass container will flow through the chamber 18, through the pipe 26, coupling 25, pipe 27, valve 28, pipe 29, T 30 and pipe 31 to the storage tank. The purpose of the joint 19 is to permit vertical adjustment of the pipe 20 to agree with the graduations.

From the foregoing description and a study of the drawings, it will be apparent that I have thus provided a very simple and efficient device whereby gasoline or other liquids may be readily dispensed and which is so constructed that the quantity dispensed may be readily seen by the purchaser, which may be readily drained and which will efficiently perform all the functions for which it is intended.

I claim:

1. A liquid-dispensing device comprising a container, an overflow conduit extending into and terminating at the upper portion of said container, a discharge pipe communicating with said container, a supply pipe communicating with said container, means for supplying liquid to said supply pipe, and valved means establishing communication between said container and said overflow conduit.

2. A liquid-dispensing device comprising a container, a pipe extending into and terminating at the upper portion of said container, a discharge pipe communicating with said container, a supply pipe communicating with said container, means for supplying liquid to said supply pipe, an overflow pipe communicating with said first-named pipe, and valved means establishing communication between said container and said last-named pipe.

3. A liquid-dispensing device comprising a container, a chamber disposed below and communicating with said container, a pipe extending through said chamber and extending into and terminating at the upper portion of said container, a valved discharge pipe communicating with said chamber, a supply pipe communicating with said chamber, means for supplying liquid to said supply pipe, an overflow pipe communicating with said first-named pipe, and valved means establishing communication between said chamber and said last-named pipe.

4. A liquid-dispensing device comprising a container provided with graduations, a chamber disposed below and communicating with said container, an overflow conduit extending through said chamber and into and terminating at the upper portion of said container, a valved discharge pipe communicating with said chamber, a supply pipe communicating with said chamber, means for supplying liquid to said supply pipe, and valved means establishing communication between said chamber and said overflow conduit.

5. A liquid-dispensing device comprising a transparent container provided with graduations, a member disposed below and communicating with said container, a pipe extending through said member in spaced relation to the walls thereof to provide an annular chamber and extending into and terminating at the upper portion of said container, a valved discharge pipe communicating with said chamber, a supply pipe communicating with said chamber, means for supplying liquid under pressure into said supply pipe, and an overflow pipe communicating with said first-named pipe, and valved means establishing communication between said chamber and said last-named pipe.

6. In apparatus of the class described, a supply-pipe and a measuring vessel; an overflow pipe for the vessel; means for supplying liquid through the supply pipe to the vessel; and a by-pass valve having connection between the overflow pipe and the supply-pipe adapted for draining the vessel.

In witness whereof I affix my signature.

EMORY CROUSE.